(12) United States Patent
Freienstein et al.

(10) Patent No.: US 12,728,844 B2
(45) Date of Patent: Sep. 8, 2026

(54) METHOD FOR INCREASING SAFETY AT A CROSSING SYSTEM

(71) Applicant: Robert Bosch GmbH, Stuttgart (DE)

(72) Inventors: Heiko Freienstein, Weil der Stadt (DE); Johannes Christian Mueller, Stuttgart (DE); Ralf Kohlhaas, Calw (DE); Stefan Ruppin, Grafenau (DE); Steffen Knoop, Hohenwettersbach (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 18/757,629

(22) Filed: Jun. 28, 2024

(65) Prior Publication Data

US 2025/0022365 A1 Jan. 16, 2025

(30) Foreign Application Priority Data

Jul. 14, 2023 (DE) ..................... 10 2023 206 691.2

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 60/0011* (2020.02);
(Continued)

(58) Field of Classification Search
CPC ............. B60W 30/0956; B60W 30/09; B60W 60/0011; B60W 60/0017;
(Continued)

(56) References Cited

U.S. PATENT DOCUMENTS 9,417,080 B2 * 8/2016 Kitahama .............. G08G 1/166
9,483,948 B1 * 11/2016 Gordon ................. B60W 30/00
(Continued)

FOREIGN PATENT DOCUMENTS

DE 102016212700 A1 1/2018
DE 102022105579 A1 7/2023
WO WO-2019076719 A1 * 4/2019 ............ B60W 30/10

OTHER PUBLICATIONS

Translation of WO-20190767719-A1, 7 pages (Year: 2019).*

*Primary Examiner* — Dale W Hilgendorf
(74) *Attorney, Agent, or Firm* — Norton Rose Fulbright US LLP

(57) ABSTRACT

A method for increasing safety at a crossing system including crosswalk. The method includes: receiving environmental signals representing an environment, including a crossing system, of a motor vehicle approaching the crossing system and wanting to cross the crossing system; specifying a boundary condition and/or an instruction for action for a crossing system maneuver to be planned for the motor vehicle on the basis of the environmental signals; planning a crossing system maneuver for the motor vehicle based on the environmental signals including ascertaining a target trajectory, fulfilling the specification, for the motor vehicle
(Continued)

based on the specification, wherein, if no target trajectory fulfilling the specification can be ascertained for the motor vehicle, the planning includes using a relaxed, at least one boundary condition and/or a relaxed, at least one instruction for action to ascertain a fallback target trajectory fulfilling the relaxed specification; outputting the correspondingly ascertained target trajectory.

8 Claims, 4 Drawing Sheets

(51) Int. Cl.

| | |
|---|---|
| ***B60W 30/18*** | (2012.01) |
| ***B60W 60/00*** | (2020.01) |
| ***G05D 1/617*** | (2024.01) |
| ***G05D 1/633*** | (2024.01) |
| ***G08G 1/005*** | (2006.01) |
| ***G08G 1/0962*** | (2006.01) |
| ***G08G 1/16*** | (2006.01) |

(52) U.S. Cl.
CPC ......... *B60W 60/0017* (2020.02); *G05D 1/617* (2024.01); *G05D 1/633* (2024.01); *G08G 1/005* (2013.01); *G08G 1/09626* (2013.01); *G08G 1/166* (2013.01); *B60W 30/18109* (2013.01); *B60W 2552/45* (2020.02); *B60W 2552/53* (2020.02); *B60W 2554/4029* (2020.02)

(58) Field of Classification Search
CPC ....... B60W 30/18109; B60W 2552/45; B60W 2552/53; B60W 2554/4029; G05D 1/617; G05D 1/633; G08G 1/005; G08G 1/09626; G08G 1/166
See application file for complete search history.

(56) References Cited

U.S. PATENT DOCUMENTS

| | | | | |
|---|---|---|---|---|
| 9,766,626 | B1 * | 9/2017 | Zhu | B60W 60/0027 |
| 10,705,530 | B2 * | 7/2020 | Aoki | G08G 1/0112 |
| 11,392,120 | B2 * | 7/2022 | Censi | B60W 60/001 |
| 11,724,715 | B2 * | 8/2023 | Watanabe | B60W 60/0015 701/25 |
| 11,753,035 | B2 * | 9/2023 | Tanaka | B60W 30/18159 701/23 |
| 12,091,014 | B2 * | 9/2024 | Mizoguchi | B60W 30/0956 |
| 12,122,366 | B2 * | 10/2024 | Okano | G06V 20/58 |
| 2011/0025529 | A1 * | 2/2011 | Uechi | G08G 1/096783 340/905 |
| 2017/0158193 | A1 * | 6/2017 | Lopez | B60W 60/0027 |
| 2017/0232964 | A1 * | 8/2017 | Moritani | B60T 7/22 701/70 |
| 2018/0025235 | A1 * | 1/2018 | Fridman | G05D 1/0251 382/103 |
| 2019/0146519 | A1 * | 5/2019 | Miura | G05D 1/0246 701/28 |
| 2019/0283746 | A1 * | 9/2019 | Shalev-Shwartz | B60W 30/0956 |
| 2020/0283014 | A1 | 9/2020 | Wray | |
| 2021/0094577 | A1 * | 4/2021 | Shalev-Shwartz | B60W 30/0953 |
| 2022/0185299 | A1 * | 6/2022 | Ye | B60W 60/00186 |
| 2022/0236737 | A1 | 7/2022 | Narang et al. | |
| 2025/0033641 | A1 * | 1/2025 | Joos | B60W 30/095 |

* cited by examiner 401
405
403

401
501
503
405
505
403

401
501
503
405
505
403

401
501
405
403

METHOD FOR INCREASING SAFETY AT A CROSSING SYSTEM

CROSS REFERENCE

The present application claims the benefit under 35 U.S.C. § 119 of German Patent Application No. DE 10 2023 206 691.2 filed on Jul. 14, 2023, which is expressly incorporated herein by reference in its entirety.

FIELD

The present invention relates to a method for increasing safety at a crossing system, in particular crosswalk, to a device, a computer program and a machine-readable storage medium.

BACKGROUND INFORMATION

U.S. Patent Application Publication No. US 2020/0283014 A1 describes a method for controlling an autonomous vehicle.

U.S. patent Application Publication No. US 2022/0185299 A1 describes a system for operating an autonomous vehicle.

U.S. Patent Application Publication No. US 2022/0236737 A1 describes a system for ascertaining a trajectory for an autonomous vehicle.

U.S. Pat. No. 11,392,120 B2 describes a method for ascertaining a trajectory for a vehicle.

At a crossing system, for example crosswalk, the situation for automated motor vehicles can change unexpectedly. For example, a pedestrian may unexpectedly step out of a building or a motor vehicle, or occlusions and perception errors may result in a pedestrian being recognized too late. As a result, it may happen that an automated motor vehicle gets into a situation from which it no longer finds a collision-free trajectory in compliance with all boundary conditions. This case can occur, for example, when the motor vehicle is approaching the crossing system and, suddenly, a pedestrian enters the crossing system at such short notice that rule-compliant stopping in front of the crossing system is no longer possible due to the necessary braking distance.

SUMMARY

An object of the present invention is to provide a concept for increasing safety at a crossing system.

This object may be achieved by features of the present invention. Advantageous example embodiments of the present invention are disclosed herein.

According to a first aspect of the present invention, a method for increasing safety at a crossing system, in particular crosswalk, is provided. According to an example embodiment of the present invention, the method comprises the following steps:

- receiving environmental signals representing an environment, comprising a crossing system, of a motor vehicle approaching the crossing system and wanting to cross the crossing system;
- specifying at least one boundary condition and/or at least one instruction for action for a crossing system maneuver to be planned for the motor vehicle on the basis of the environmental signals;
- planning a crossing system maneuver for the motor vehicle on the basis of the environmental signals,
- wherein planning comprises ascertaining a target trajectory, fulfilling the specification, for the motor vehicle on the basis of the specification, wherein, if no target trajectory fulfilling the specification can be ascertained for the motor vehicle, planning comprises using a relaxed, at least one boundary condition and/or a relaxed, at least one instruction for action to ascertain a fallback target trajectory fulfilling the relaxed specification;
- outputting the correspondingly ascertained target trajectory.

According to a second aspect of the present invention, a device is provided, which is configured to carry out all steps of the method according to the first aspect of the present invention.

According to a third aspect of the present invention, a computer program is provided, which comprises instructions which, when the computer program is carried out by a computer, for example by the device according to the second aspect of the present invention, cause this computer to perform a method according to the first aspect of the present invention.

According to a fourth aspect of the present invention, a machine-readable storage medium is provided, on which the computer program according to the third aspect is stored.

The present invention is based on and includes the knowledge that the above object may be achieved in that at least one boundary condition and/or at least one instruction for action are specified for planning a crossing system maneuver, wherein, if no target trajectory that fulfills the at least one boundary condition and/or the at least one instruction for action can be ascertained for the motor vehicle, a relaxed, at least one boundary condition and/or a relaxed, at least one instruction for action is used to ascertain a fallback target trajectory that fulfills the relaxed, at least one boundary condition and/or the relaxed, at least one instruction for action. This means, therefore, that at least one fallback level is used to ascertain a target trajectory for the motor vehicle if the original boundary condition or the original instruction for action cannot be fulfilled or followed. By providing at least one fallback level, it is thus possible to ascertain a target trajectory even if there is no longer a solution for this original specification in compliance with the original boundary condition or instruction for action. In particular, hard requirements for the target trajectory are thus relaxed incrementally such that a violation of the boundary condition or of the instruction for action is as minor as possible.

This in particular brings about a technical advantage that a concept is provided that, by specifically softening or relaxing the formulated boundary condition or instruction for action, makes it possible that a motor vehicle can free itself in an automated manner from a critical situation that occurs at a crossing system.

Thus, this in particular brings about a further technical advantage that safety at a crossing system can be efficiently increased.

If the plural is used for the boundary condition, the singular should always be implied, and vice versa. If the plural is used for the instruction for action, the singular should always be implied, and vice versa.

The phrase "at least one" means "one or more."

A crossing system within the meaning of the description herein is, for example, one of the following crossing systems: crosswalk, also known as a zebra crossing, pedestrian crossing, refuge island.

In one example embodiment of the method of the present invention, it is provided that, if no fallback target trajectory fulfilling the relaxed specification can be ascertained for the motor vehicle, planning comprises that a further and further relaxed, at least one boundary condition and/or a further and further relaxed, at least one instruction for action is used until a fallback target trajectory fulfilling the correspondingly further and further relaxed specification is ascertained or until a fallback target trajectory fulfilling the correspondingly further and further relaxed specification at least to a predetermined extent is ascertained.

This, for example, brings about a technical advantage that a target trajectory can be ascertained even if there is no longer a solution in compliance with a boundary condition or instructions for action. The hard requirements for the target trajectory are thus relaxed incrementally such that the violation of the boundary conditions or instructions for action is as minor as possible. At the same time, the degradation or relaxation takes place only if a solution for the stricter boundary conditions can no longer be found.

In one example embodiment of the method of the present invention, it is provided that motor vehicle state signals describing a motor vehicle state are received, wherein specifying and planning are carried out on the basis of the motor vehicle state signals.

This, for example, brings about the technical advantage that specifying and planning can be carried out efficiently.

A motor vehicle state is described, for example, by a pose and/or a velocity and/or an acceleration of the motor vehicle.

In one example embodiment of the method of the present invention, it is provided that specifying is carried out on the basis of a predetermined set of rules comprising one or more rules for a behavior of a motor vehicle at a crossing system.

This, for example, brings about the technical advantage that specifying can be carried out efficiently.

One rule is, for example, that the motor vehicle is to cross the crossing system if the crossing system is free.

One rule is, for example, that the motor vehicle is to stop in time in front of the crossing system used by a pedestrian, generally a living being, in particular an animal. The term "in front of the crossing system" means that a virtual stop line or a virtual stopping point in front of which the motor vehicle is to stop is in front of the crossing system in the driving direction of the motor vehicle.

One rule is, for example, that, if the motor vehicle cannot stop in time in front of the crossing system used by the pedestrian, the motor vehicle is to stop in time in front of the pedestrian on the crossing system. The term "in front of the pedestrian on the crossing system" means that a virtual stop line or a virtual stopping point in front of which the motor vehicle is to stop is in front of the pedestrian on the crossing system in the driving direction of the motor vehicle.

One rule is, for example, that, if the motor vehicle cannot stop in time in front of the pedestrian on the crossing system used by the pedestrian, the motor vehicle is to carry out an evasive maneuver in order to avoid the pedestrian.

In one example embodiment of the method of the present invention, it is provided that, on the basis of the environmental signals, a decision is made as to whether the crossing system is free, wherein, if yes, the at least one boundary condition and/or the at least one instruction for action specifies restricting a trip of the motor vehicle to its current lane, wherein, if no, the at least one boundary condition and/or the at least one instruction for action specifies stopping the motor vehicle in front of a virtual stop line that is located in front of the crossing system in the driving direction of the motor vehicle.

This, for example, brings about a technical advantage that the motor vehicle can efficiently pass through the crossing system if the crossing system is free, or that the motor vehicle can still stop in front of the crossing system if the crossing system is not free.

In one example embodiment of the method of the present invention, it is provided that a (further and further) relaxed, at least one boundary condition and/or a (further and further) relaxed, at least one instruction for action specifies one or more of the following specifications in each case: stopping in front of a virtual stop line that is located on the crossing system; stopping in front of a virtual stop line that is located on the crossing system and in front of a road user, in particular pedestrian, wanting to cross the crossing system;

driving around an obstacle, in particular pedestrian, without collision; braking at most with a predetermined maximum deceleration.

The term "driving around" within the meaning of the description means driving around without collision, i.e., driving around the obstacle on the outside. The term "avoiding" can be used as a synonym for driving around.

This, for example, brings about the technical advantage that multiple sensible fallback levels can be specified or used.

In one example embodiment of the method of the present invention, it is provided that the (further and further) relaxed specification is calculated sequentially after feedback that no fallback target trajectory fulfilling the specification or relaxed specification can be ascertained for the motor vehicle, or wherein the (further and further) relaxed specification is calculated in parallel so that the (further and further) relaxed specification is already available for planning the crossing system maneuver.

This, for example, brings about a technical advantage that, in the case of calculating sequentially, the fallback levels are only calculated if necessary in the specific situation. Existing hardware resources can thus be used efficiently.

This, for example, brings about a technical advantage that, in the case of calculating in parallel, the fallback levels can already be used for planning the crossing system maneuver. Planning the crossing system maneuver can thus be carried out efficiently and quickly so that it is possible to react correspondingly quickly to a specific traffic situation.

In one example embodiment of the method of the present invention, the method is a computer-implemented method.

A device according to the second aspect of the present invention is, for example, configured in terms of program technology to execute the computer program.

Embodiments provided in connection with the device apply analogously to the method, and vice versa. This means that device features result analogously from corresponding method features, and vice versa.

When the term "boundary condition" is used, "instruction for action" should always be implied, and vice versa.

The motor vehicle is, for example, an at least partly automated motor vehicle. This means that the motor vehicle can be guided in an at least partly automated manner, i.e., that a longitudinal guidance and/or lateral guidance of the motor vehicle can be controlled in an at least partly automated manner.

The phrase "at least partly automated guidance" includes one or more of the following cases: assisted guidance, partly automated guidance, highly automated guidance, fully automated guidance. The phrase "at least partly automated" thus includes one or more of the following phrases: assisted, partly automated, highly automated, fully automated.

Assisted driving means that a driver of the motor vehicle continuously carries out either the lateral guidance or the longitudinal guidance of the motor vehicle. The respectively other driving task (i.e., controlling the longitudinal guidance or lateral guidance of the motor vehicle) is carried out automatically. This means that either the lateral guidance or the longitudinal guidance is controlled automatically when the motor vehicle is guided in an assisted manner.

Partly automated guidance means that, in a specific situation (for example: driving on a freeway, driving in a parking lot, passing an object, driving within a lane defined by lane markings) and/or for a certain period of time, a longitudinal guidance and a lateral guidance of the motor vehicle are controlled automatically. A driver of the motor vehicle does not have to manually control the longitudinal guidance and lateral guidance of the motor vehicle. However, the driver has to continually monitor the automatic control of the longitudinal guidance and lateral guidance in order to be able to intervene manually when necessary. The driver must be ready at all times to fully take over motor vehicle guidance.

Highly automated guidance means that, for a certain period of time in a specific situation (for example: driving on a freeway, driving in a parking lot, passing an object, driving within a lane defined by lane markings), longitudinal guidance and lateral guidance of the motor vehicle are controlled automatically. A driver of the motor vehicle does not have to manually control the longitudinal guidance and lateral guidance of the motor vehicle. The driver does not have to continuously monitor the automatic control of the longitudinal guidance and lateral guidance in order to be able to intervene manually when necessary. When necessary, a take-over request to take over control of the longitudinal guidance and lateral guidance is automatically issued, in particular issued with a sufficient time reserve, to the driver. The driver thus has to potentially be able to take control of the longitudinal guidance and lateral guidance. Limits of the automatic control of the lateral guidance and longitudinal guidance are recognized automatically. In highly automated guidance, it is not possible to automatically bring about a minimal risk state in every initial situation.

Fully automated guidance means that, in a specific situation (for example: driving on a freeway, driving in a parking lot, passing an object, driving within a lane defined by lane markings), longitudinal guidance and lateral guidance of the motor vehicle are controlled automatically. A driver of the motor vehicle does not have to manually control the longitudinal guidance and lateral guidance of the motor vehicle. The driver does not have to monitor the automatic control of the longitudinal guidance and lateral guidance in order to be able to intervene manually when necessary. Before the automatic control of the lateral guidance and longitudinal guidance is ended, the driver is automatically requested to take over the driving task (control of the lateral guidance and longitudinal guidance of the motor vehicle), in particular with a sufficient time reserve. If the driver does not take over the driving task, returning to a minimal risk state takes place automatically. Limits of the automatic control of the lateral guidance and longitudinal guidance are recognized automatically. In all situations, it is possible to automatically return to a minimal risk system state.

According to an example embodiment of the present invention, the device, for example, comprises an analysis module 805 and a planning module 807. The analysis module is, for example, implemented as a hardware module and/or software module. The planning module is, for example, implemented as a hardware module and/or software module.

For example, the two modules 805, 807 are each standalone modules, i.e., they are independent of one another.

The device, for example, receives environmental signals representing an environment, comprising a crossing system, of a motor vehicle approaching the crossing system and wanting to cross the crossing system. The environmental signals, for example, comprise an environmental model of the motor vehicle.

The environmental signals are, for example, provided to the analysis module and/or to the planning module.

The analysis module, for example, analyzes the environmental signals, i.e., analyzes the environment, and, for example, specifies one or more instructions for action and/or one or more boundary conditions to the planning module on the basis of the analysis.

The planning module, for example, plans a crossing system maneuver for the motor vehicle on the basis of the specification and on the basis of the environmental signals. If the planning module no longer finds a solution for the specification, the analysis model 805 can, for example, ascertain relaxed boundary conditions or relaxed instructions for action and specify them to the planning module.

As a result of the planning by the planning module, a target trajectory is ascertained and output, on the basis of which the motor vehicle can be guided in an at least partly automated manner.

The embodiment examples and embodiments described here of the present invention can be combined with one another in any way even if this is not explicitly described.

The present invention is explained in more detail below using preferred embodiment examples.

DETAILED DESCRIPTION OF EXAMPLE EMBODIMENTS

In the following, the same reference signs may be used for the same features.

Figure 1:
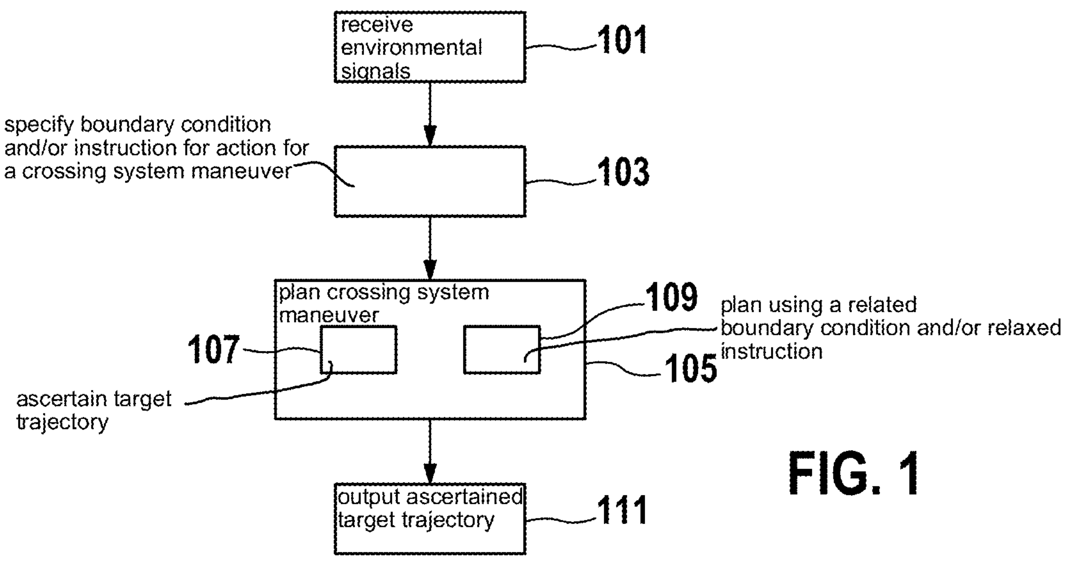
FIG. 1 shows a block diagram of an example method according to the first aspect of the present invention.

FIG. 1 shows a flowchart of a method for increasing safety at a crossing system, in particular crosswalk, comprising the following steps:

receiving 101 environmental signals representing an environment, comprising a crossing system, of a motor vehicle approaching the crossing system and wanting to cross the crossing system;

specifying 103 at least one boundary condition and/or at least one instruction for action for a crossing system maneuver to be planned for the motor vehicle on the basis of the environmental signals;

planning 105 a crossing system maneuver for the motor vehicle on the basis of the environmental signals, wherein planning 105 comprises ascertaining 107 a target trajectory, fulfilling the specification, for the motor vehicle on the basis of the specification, wherein, if no target trajectory fulfilling the specification can be ascertained for the motor vehicle, planning 105 comprises using 109 a relaxed, at least one boundary condition and/or a relaxed, at least one instruction for action to ascertain a fallback target trajectory fulfilling the relaxed specification;

outputting 111 the correspondingly ascertained target trajectory.

The method comprises, for example, at least partly automated control of a lateral guidance and/or longitudinal guidance of the motor vehicle on the basis of the output target trajectory.

Figure 2:
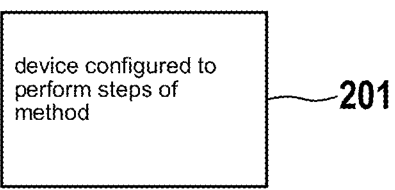
FIG. 2 shows an example device according to the second aspect of the present invention.

FIG. 2 shows a device 201 configured to perform all steps of the method according to the first aspect.

Figure 3:
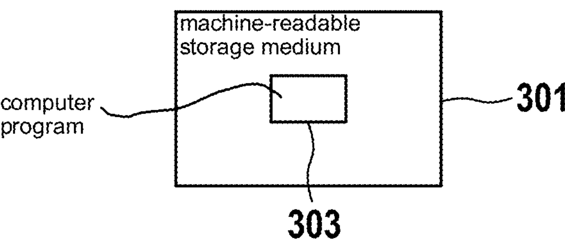
FIG. 3 shows a machine-readable storage medium according to the fourth aspect of the present invention.

FIG. 3 shows a machine-readable storage medium 301, on which a computer program 303 is stored. The computer program 303 comprises instructions that, when the computer program 303 is executed by a computer, cause the computer to perform a method according to the first aspect.

Figures 4, 5, 6, 7:
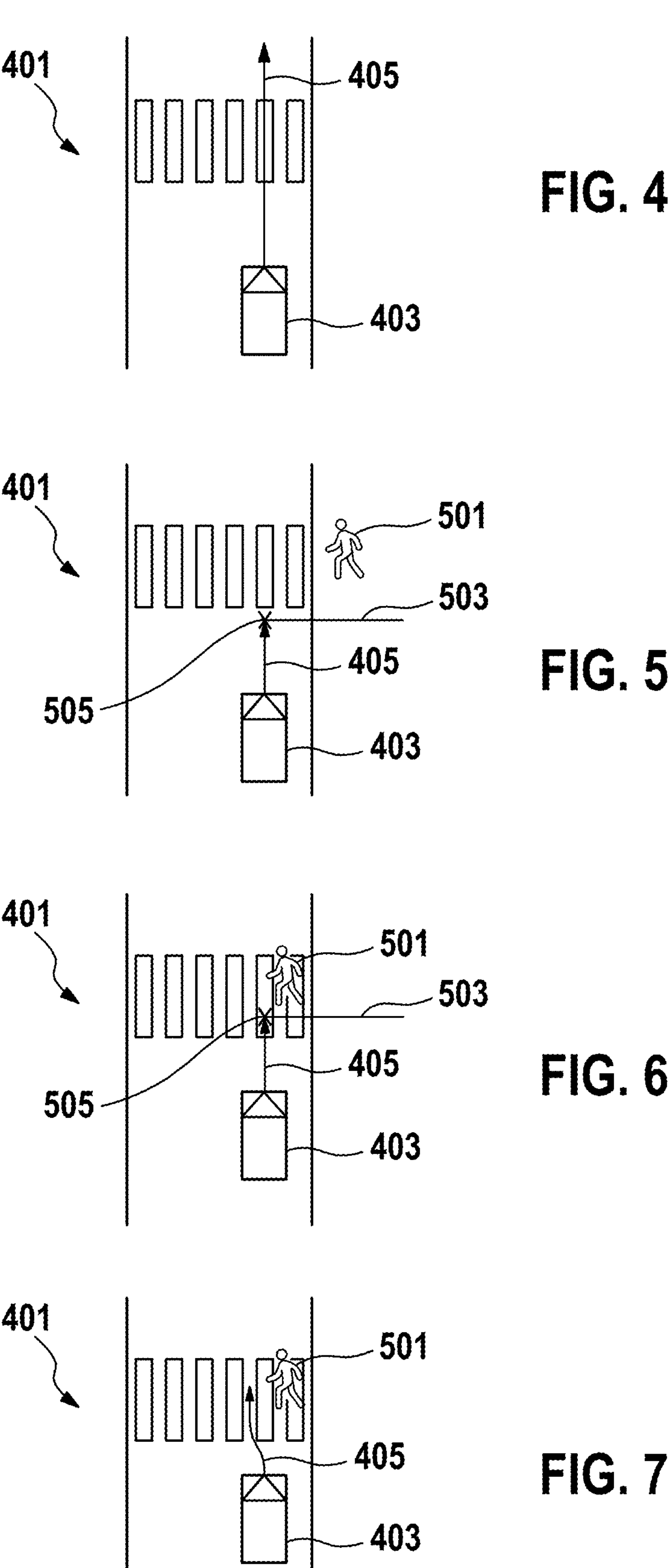
FIG. 4-7 show different fallback levels in each case, according to example embodiments of the present invention.

FIG. 4 shows a crosswalk 401 as an example of a crossing system. A motor vehicle 403 approaches the crossing system, i.e., the crosswalk 401. According to the representation shown in FIG. 4, the crosswalk 401, colloquially also referred to as a zebra crossing, is free. The motor vehicle 403 may thus pass through the crosswalk 401. Reference sign 405 points to a correspondingly ascertained target trajectory, on the basis of which the motor vehicle 403 can pass through the crosswalk 401 in an at least partly automated manner.

FIG. 5 shows the crosswalk 401, with a pedestrian 501 wanting to cross the crosswalk 401. One boundary condition in this case is that the motor vehicle 403 stops in front of a virtual stop line 503, which is located in front of the crosswalk 401. Furthermore, an "X" with reference sign 505 is shown, which is located on the virtual stop line 503 and symbolically denotes a location in front of which the motor vehicle 403 is to stop.

If this boundary condition, i.e., stopping in front of the virtual stop line 503, which is located in front of the crosswalk 401, can no longer be fulfilled, it is provided according to FIG. 6 that a relaxed boundary condition is used, which specifies that the motor vehicle 403 stops in front of a virtual stop line 503 that is located on the crosswalk 401 but in front of the pedestrian 501, who by now has stepped onto the crosswalk 401 according to the representation shown in FIG. 6.

If this boundary condition can also no longer be fulfilled, a further relaxed boundary condition specifies that the motor vehicle 403 is to drive around the pedestrian 501, i.e., avoid the pedestrian 501. Accordingly, an evasive trajectory is ascertained, the target trajectory 405 shown in FIG. 7, which guides around the obstacle, the pedestrian 501 in the present case.

Figure 8:
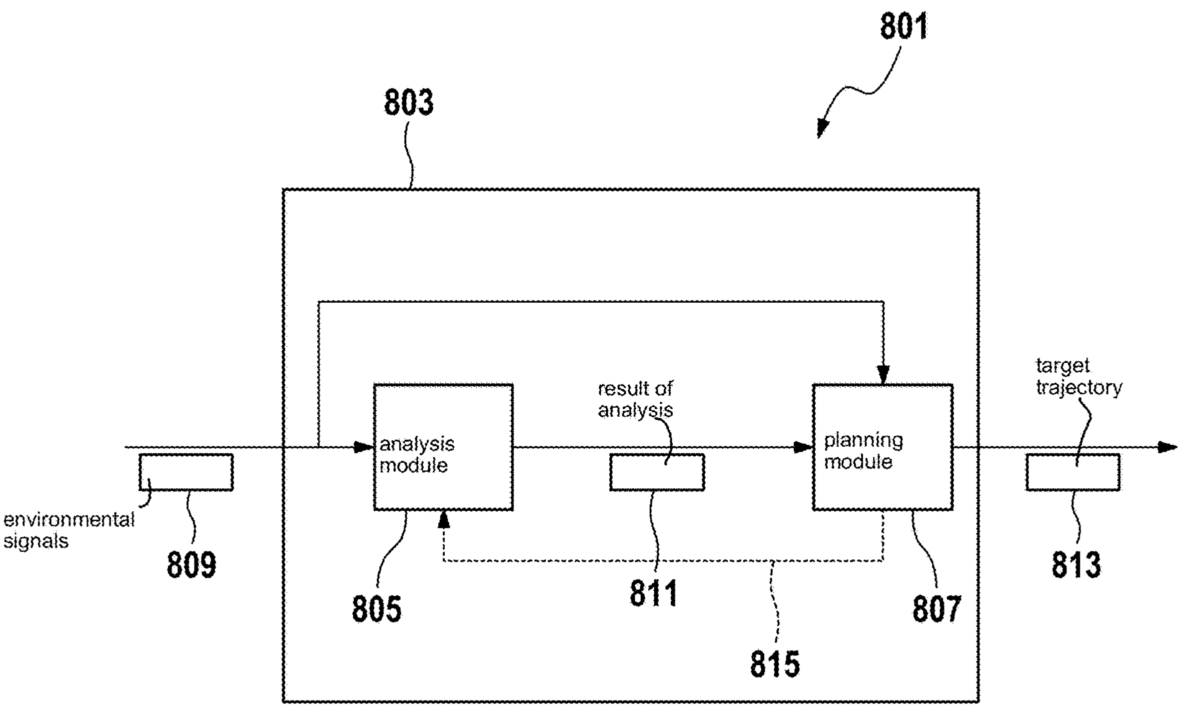
FIG. 8 shows a block diagram of an example device according to the second aspect of the present invention.

FIG. 8 shows a block diagram 801 of a device 803 according to the second aspect.

The device 803 comprises an analysis module 805 and a planning module 807. The analysis module 805 is, for example, implemented as a hardware module and/or software module. The planning module 807 is, for example, implemented as a hardware module and/or software module.

For example, the two modules 805, 807 are each standalone modules, i.e., they are independent of one another.

The device 803 is provided with environmental signals 809. This means that the device 803 receives environmental signals 809 representing an environment, comprising a crossing system, of a motor vehicle approaching the crossing system and wanting to cross the crossing system. The environmental signals 809, for example, comprise an environmental model of the motor vehicle.

The environmental signals 809 are provided to both the analysis module 805 and the planning module 807.

The analysis module analyzes the environmental signals 809, i.e., analyzes the environment, and specifies one or more instructions for action and/or one or more boundary conditions to the planning module 807 on the basis of the analysis. The result of this analysis, i.e., the one or more instructions for action and/or the one or more boundary conditions, is symbolically denoted by a quadrilateral with reference sign 811.

The planning module 807 plans a crossing system maneuver for the motor vehicle on the basis of the specification and on the basis of the environmental signals. If the planning module 807 no longer finds a solution for the specification, the analysis module 805 can, for example, ascertain relaxed boundary conditions or relaxed instructions for action and specify them to the planning module 807.

As a result of the planning by the planning module 807, a target trajectory 813 is ascertained and output, on the basis of which the motor vehicle can be guided in an at least partly automated manner.

The planning module 807 can, for example, provide feedback to the analysis module 805 that it could not ascertain a fallback target trajectory, fulfilling the specification or relaxed specification, for the motor vehicle. In this case, the analysis module can then, for example, further relax the specification or already relaxed specification and output the further relaxed specification to the planning module 807. If the planning module 807 also cannot ascertain a fallback target trajectory fulfilling the (further) relaxed specification, the planning module 807 can, for example, again provide corresponding feedback to the analysis module 805 so that said analysis module can again ascertain a further and further relaxed specification and output it to the planning module 807.

It is thus, for example, possible to realize a feedback loop, according to which the planning module 807 provides feedback to the analysis module 805 whenever it could not ascertain a fallback target trajectory, fulfilling the specification or relaxed specification, for the motor vehicle, so that the analysis module 805 carries out the step of ascertaining a further and further relaxed specification and outputting the further and further relaxed specification to the planning module 807, wherein the feedback loop is run through until the planning module 807 could ascertain a fallback target trajectory, fulfilling the specification or relaxed specification, for the motor vehicle.

This optional feedback loop is symbolically represented by a dashed arrow with reference sign 815.

Figure 9:
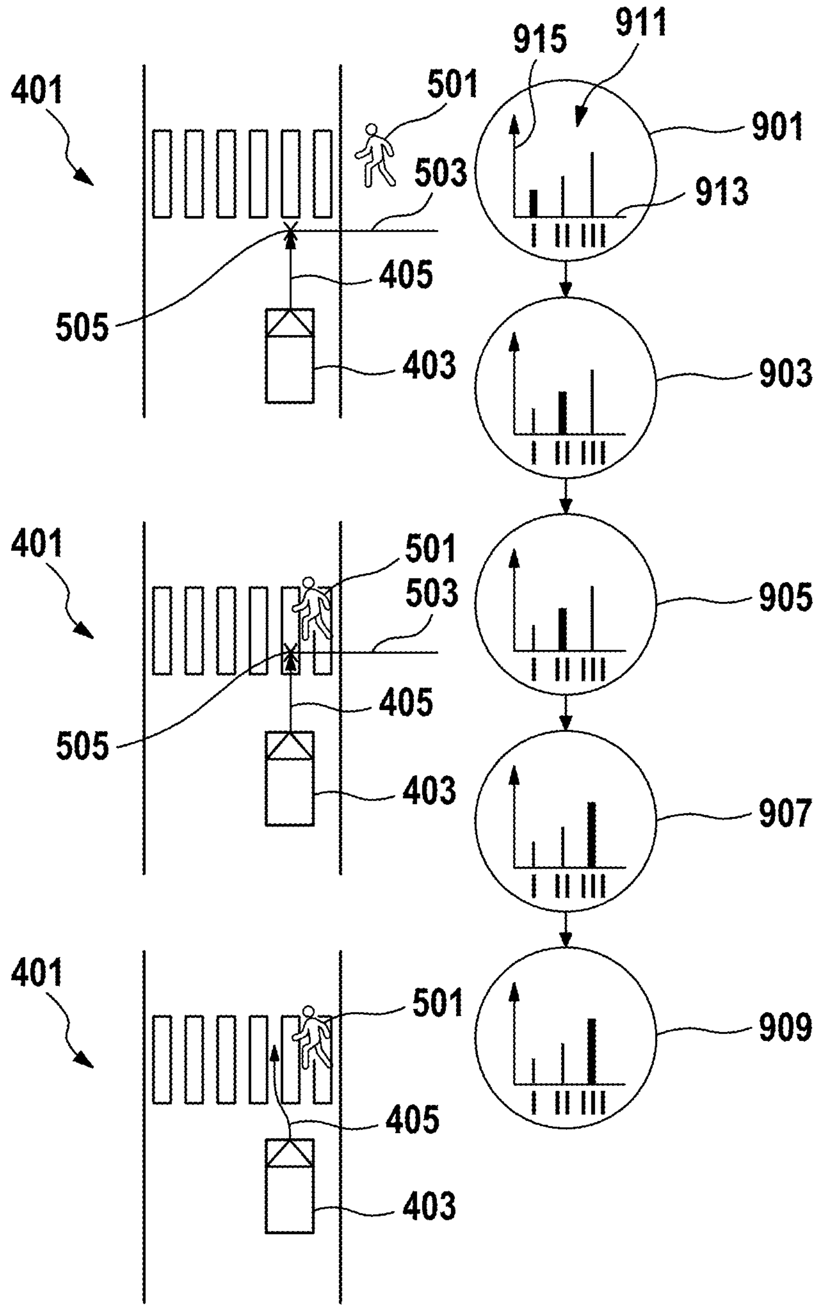
FIG. 9 shows multiple fallback levels according to an example embodiment of the present invention.

FIG. 9 shows the traffic situations shown in FIGS. 5 to 7 in one figure. The traffic situation shown in FIG. 5 is shown at the top. The traffic situation shown in FIG. 7 is shown at the bottom. The traffic situation shown in FIG. 6 is shown in between.

Two boundary conditions, a first boundary condition 901 and a second boundary condition 903, are assigned to the traffic situation according to FIG. 5, i.e., the traffic situation shown at the top. A third boundary condition 905 and a fourth boundary condition 907 are assigned to the middle traffic situation, i.e., the traffic situation shown in FIG. 6. A fifth boundary condition 909 is assigned to the bottom traffic situation, i.e., the traffic situation shown in FIG. 7.

The boundary conditions 901 to 909 are further and further relaxed boundary conditions. The boundary conditions 901 to 909, for example, comprise different braking behavior 911, which is symbolically represented by a graph comprising an abscissa 913 and an ordinate 915. Three different braking levels, denoted by I, II, and III, are drawn on the abscissa 913. Here, the braking level II is greater than the braking level I, and the braking level III is greater than the braking level II. The ordinate 915 represents the deceleration.

Depending on the boundary condition 901 to 909, a corresponding line is shown in bold for one of the braking levels I to III in order to make it clear that this braking level is specified for this boundary condition.

The braking level indicates the deceleration with which the motor vehicle is to brake according to the boundary condition.

In summary, the concept described here is based in particular on an analysis module based on a set of rules, which analysis module, depending on the current situation, specifies the boundary conditions for the crossing system maneuver to be planned, in particular zebra crossing maneuver, to a subordinate planning module.

The concept is described below using the example of a zebra crossing. The concept can also be applied to other crossing systems.

In this case, the analysis module does not rely on feedback of the result of subordinate planning layers, since it is designed to generate driving strategies/driving options on the basis of a reasoned set of rules rather than on the basis of the drivability. The drivability is then assessed in a subordinate manner, in particular by a planning module. Feedback may, for example, be provided if a temporal stabilization of the decision is necessary. the analysis module softens the boundary conditions or instructions for action to be complied with, for example when creating candidates according to the following scheme:

1. Normal case: Either the zebra crossing is free and the automated motor vehicle can safely pass through the zebra crossing in a rule-compliant manner or the automated motor vehicle can stop at the stop line in front of the zebra crossing.
2. Accident prevention 1: The zebra crossing is occupied, and the automated vehicle can no longer stop at the zebra crossing. In this case, the stop line is moved onto the zebra crossing but to in front of the pedestrian closest to the automated motor vehicle along the road.
3. Accident prevention 2: The zebra crossing is occupied, and the automated motor vehicle can no longer brake to a stop in front of the nearest pedestrian. In this case, the stop line is completely eliminated and the objects are specified as obstacles which the motor vehicle must drive around, i.e., which the motor vehicle must avoid. In addition, it is specified to the vehicle that the vehicle must brake.

The advantage of the concept is in particular that, due to the specified fallback levels, the automated motor vehicle equipped therewith finds a target trajectory even if there is no longer a solution in compliance with all boundary conditions or instructions for action. The hard requirements for the target trajectory are incrementally relaxed such that the violation of the boundary conditions or instructions for action is as minor as possible. At the same time, the degradation takes place only if a solution for the stricter boundary conditions can no longer be found. The rule-compliant and risk-adverse handling of pedestrians, in particular also on zebra crossings, will be part of the approval argumentation in the approval process of automated motor vehicles and will have to be demonstrated accordingly. The described concept can be used as an explicit model in such an approval process in order to disclose the mechanisms used and the resulting behaviors to the authorities.

Legislation, standards and results from the HARA (hazard analysis and risk assessment; in German: Gefahren-und Risikoanalyse (GuR)) define maximum deceleration limits depending on the situation. The described concept allows this selection of the maximum deceleration limits to be made in a suitable manner.

For example, a digital map, a dynamic occupancy grid map, as well as the motor vehicle state (for example, pose, velocity, acceleration) are used. On the basis of the occupancy grid map, the analysis module, for example, decides whether the zebra crossing is free. To this end, the analysis module, for example, uses a catching region, which is entered in the digital map. If the zebra crossing is free, the analysis module, for example, restricts the trip of the automated motor vehicle only to the lane so that the subordinate planning module plans beyond the zebra crossing. If a further motor vehicle precedes the automated motor vehicle, the automated motor vehicle, for example, follows the further automated motor vehicle. If, on the other hand, a pedestrian is found in the catching region of the zebra crossing (i.e., occupied cells in the occupancy grid map), the analysis module forces, for example, stopping at the stop line in front of the zebra crossing, which stop line is likewise taken from the digital map.

If, in the specified boundary conditions, the subordinate planning module no longer finds a solution for stopping at the stop line, the analysis module, for example, determines, by projecting the occupied cells onto the lane and subtracting a safety margin in the longitudinal direction, a new stop line at which the automated motor vehicle must stop at the latest. If there are multiple pedestrians in the catching region of the zebra crossing, the stop line that is closest to the automated motor vehicle is selected. One embodiment provides that rapid stopping is additionally generated by adjusting optimization criteria in the subordinate planning module.

If the automated motor vehicle can also no longer comply with this stop line, because the subordinate planning module can also no longer find a solution for it, the stop line is completely eliminated. Instead, by circles around the occupied cells, the pedestrians are marked as obstacles which the automated motor vehicle must drive around, i.e., which the motor vehicle thus must avoid. For this purpose, the optimization criteria can also be adjusted again such that additional braking is achieved. If, however, avoiding is not possible with the desired braking deceleration at the same time (e.g., slippery road), the optimization criteria can be adjusted in the sense of a multi-target optimization to this situation. However, this adjustment always takes place, for example, such that it offers the most suitable solution for the situation from a technical point of view and, for example, never weighs one life against another. In one embodiment, the pedestrians can be represented more precisely on the basis of a prediction by polygons rather than by circles.

Alternatively, or additionally, instead of an occupancy representation, an object representation of the environment could be used. In addition, a fusion of the occupancy grid map and the object representation can be provided.

In one embodiment, the standard behavior and its fallback strategies are calculated in parallel rather than sequentially. Depending on the situation, there may be little time to respond. For the calculation of the particular behavior, a fixedly specified time is available to the planning module. If the calculation cannot be completed in the specified time window, the corresponding behavior is classified as invalid. After the time has elapsed, or when all behaviors have been calculated, the behavior that is highest in the hierarchy is selected from the remaining valid behaviors.

In one embodiment, estimates are used to ascertain at an early stage which solutions are not promising and are thus invalid. This estimation can be carried out with little computational effort. For example, an estimate of the braking distance may be such an estimate.

In a further embodiment example, maximum deceleration limits from legislation, standards and results from the HARA are selected depending on the situation (cf. FIG. 9). Accordingly, the braking deceleration can be divided into at least 2 categories. The behavior patterns (normal case, accident prevention 1, accident prevention 2) are assigned braking decelerations of the particular categories by means of the hierarchy so that a linearly ordered, combinational variety is created.

What is claimed is:

1. A method for increasing safety at a crossing system including a crosswalk, comprising the following steps:

receiving environmental signals representing an environment of a motor vehicle approaching the crossing system;

based on the environmental signals, specifying an initial set of one or more boundary conditions and/or one or more instructions for action that define constraints that must be satisfied by a target trajectory for a crossing system maneuver of the motor vehicle;

planning, by a computer executing planning software and based on the environmental signals, the crossing system maneuver for the motor vehicle by attempting to compute the target trajectory to satisfy the initial set of boundary conditions and/or instructions for action;

determining, during the planning, that no target trajectory exists that satisfies the initial set of boundary conditions and/or instructions for action;

in response to determining that no target trajectory exists, modifying the initial set of boundary conditions and/or instructions for action to form a relaxed set of boundary conditions and/or instructions for action;

re-planning, by the computer executing the planning software, the crossing system maneuver using the relaxed set of boundary conditions and/or instructions for action;

iteratively repeating the modifying and re-planning until the computer executing the planning software computes a fallback target trajectory that satisfies a current iteration of the boundary conditions and/or instructions for action, each iteration, after a first of the iterations, further relaxing the boundary conditions compared to the immediately preceding iteration; and controlling operation of the motor vehicle in accordance with the computed fallback target trajectory to perform the crossing system maneuver.

2. The method according to claim 1, wherein motor vehicle state signals describing a motor vehicle state are received, and wherein the specifying and the planning are carried out based on the motor vehicle state signals.

3. The method according to claim 1, wherein the specifying is carried out based on a predetermined set of rules including one or more rules for a behavior of the motor vehicle at the crossing system.

4. The method according to claim 1, wherein, based on the environmental signals, a decision is made as to whether the crossing system is free, wherein, when the decision is made that the crossing system is free, the initial set of boundary conditions and/or instructions for action specifies restricting a trip of the motor vehicle to its current lane, and wherein, when the decision is made that the crossing system is not free, the initial set of boundary conditions and/or instructions for action specifies stopping the motor vehicle in front of a virtual stop line that is located in front of the crossing system in a driving direction of the motor vehicle.

5. The method according to claim 4, wherein the relaxed set of boundary conditions and/or instructions for action specifies one or more of the following specifications in each case:

(i) stopping in front of the virtual stop line that is located on the crossing system;

(ii) stopping in front of the virtual stop line that is located on the crossing system and in front of a pedestrian wanting to cross the crossing system;

(iii) driving around the pedestrian without collision; and (iv) braking at most with a predetermined maximum deceleration.

6. The method according to claim 1, wherein the modifying of the boundary conditions and/or instructions for action and the re-planning are carried out such that: (i) the modification is calculated sequentially after feedback that no target trajectory satisfying a current one of the iterations of the boundary conditions and/or instructions for action can be computed, or (ii) the modification is calculated in parallel so that a further relaxed set of boundary conditions and/or instructions for action is already available for re-planning the crossing system maneuver.

7. A device configured to increase safety at a crossing system including a crosswalk, the device comprising a computer configured to:

receive environmental signals representing an environment of a motor vehicle approaching the crossing system;

based on the environmental signals, specify an initial set of one or more boundary conditions and/or one or more instructions for action that define constraints that must be satisfied by a target trajectory for a crossing system maneuver of the motor vehicle;

plan, by execution of planning software and based on the environmental signals, the crossing system maneuver for the motor vehicle by attempting to compute the target trajectory to satisfy the initial set of boundary conditions and/or instructions for action;

determine, during the planning, that no target trajectory exists that satisfies the initial set of boundary conditions and/or instructions for action;

in response to determination that no target trajectory exists, modify the initial set of boundary conditions and/or instructions for action to form a relaxed set of boundary conditions and/or instructions for action;

re-plan, by the execution of the planning software, the crossing system maneuver using the relaxed set of boundary conditions and/or instructions for action;

iteratively repeat the modifying and re-planning until the computer executing the planning software computes a fallback target trajectory that satisfies a current iteration of the boundary conditions and/or instructions for action, each iteration, after a first of the iterations, further relaxing the boundary conditions compared to the immediately preceding iteration; and control operation of the motor vehicle in accordance with the computed fallback target trajectory to perform the crossing system maneuver.

8. A non-transitory machine-readable storage medium on which is stored a computer program for increasing safety at a crossing system including a crosswalk, the computer program, when executed by a computer, causing the computer to perform the following steps:

receiving environmental signals representing an environment of a motor vehicle approaching the crossing system;

based on the environmental signals, specifying an initial set of one or more boundary conditions and/or one or more instructions for action that define constraints that must be satisfied by a target trajectory for a crossing system maneuver of the motor vehicle;

planning, by execution of planning software and based on the environmental signals, the crossing system maneuver for the motor vehicle by attempting to compute the target trajectory to satisfy the initial set of boundary conditions and/or instructions for action;

determining, during the planning, that no target trajectory exists that satisfies the initial set of boundary conditions and/or instructions for action;

in response to determining that no target trajectory exists, modifying the initial set of boundary conditions and/or instructions for action to form a relaxed set of boundary conditions and/or instructions for action;

re-planning, by the execution of the planning software, the crossing system maneuver using the relaxed set of boundary conditions and/or instructions for action;

iteratively repeating the modifying and re-planning until the computer executing the planning software computes a fallback target trajectory that satisfies a current iteration of the boundary conditions and/or instructions for action, each iteration, after a first of the iterations, further relaxing the boundary conditions compared to the immediately preceding iteration; and controlling operation of the motor vehicle in accordance with the computed fallback target trajectory to perform the crossing system maneuver.

* * * * *